(12) United States Patent
DeLuca

(10) Patent No.: US 8,947,222 B2
(45) Date of Patent: Feb. 3, 2015

(54) METHODS AND APPARATUS TO DETECT MOBILE DEVICES

(75) Inventor: Michael Joseph DeLuca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 203 days.

(21) Appl. No.: 13/634,817

(22) PCT Filed: Feb. 24, 2011

(86) PCT No.: PCT/US2011/026076
§ 371 (c)(1),
(2), (4) Date: Sep. 13, 2012

(87) PCT Pub. No.: WO2012/115649
PCT Pub. Date: Aug. 30, 2012

(65) Prior Publication Data
US 2013/0012123 A1    Jan. 10, 2013

(51) Int. Cl.
*B60Q 1/00* (2006.01)
*H04B 7/00* (2006.01)
(Continued)

(52) U.S. Cl.
CPC .............. *H04M 1/7253* (2013.01); *A45C 13/18* (2013.01); *G01V 15/00* (2013.01); *G08B 21/24* (2013.01); *H04M 1/6075* (2013.01); *H04M 2250/02* (2013.01); *H04M 2250/04* (2013.01); *Y02B 60/50* (2013.01)
USPC .......................................... 340/457; 455/41.2

(58) Field of Classification Search
CPC ................................ H04W 4/008; G08B 21/24
USPC ........ 455/39, 41.2, 41.1, 41.3; 340/457, 5.61, 340/425.5, 686.1, 686.6
See application file for complete search history.

(56) References Cited

U.S. PATENT DOCUMENTS

| 5,889,472 A | 3/1999 | Nagel et al. |
| 6,631,271 B1 | 10/2003 | Logan |

(Continued)

FOREIGN PATENT DOCUMENTS

| DE | 102004008181 | 9/2005 |
| DE | 102009016878 | 10/2010 |

(Continued)

OTHER PUBLICATIONS http://www.google.co.in/patents/DE102004008181A1?cl=en See enclosed PDF file of above document in PDF format, pp. 1-5. (Patent DE102004008181A1).*

(Continued)

*Primary Examiner* — Sonny Trinh
(74) *Attorney, Agent, or Firm* — Hanley, Flight and Zimmerman, LLC

(57) ABSTRACT

Example methods and apparatus to detect mobile devices are disclosed. A disclosed example apparatus includes a processor and a memory in communication with the processor having instructions stored thereon that, when executed, cause the processor to determine whether a first wireless transceiver is in communication range of a vehicle. The first wireless transceiver is to provide an identifier associated with a person. When the first wireless transceiver is not in communication range of the vehicle, a second wireless transceiver in the vehicle is transitioned from a first power transmission mode to a relatively lower power transmission mode.

19 Claims, 6 Drawing Sheets

(51) Int. Cl.
| | |
|---|---|
| *H04M 1/725* | (2006.01) |
| *A45C 13/18* | (2006.01) |
| *G01V 15/00* | (2006.01) |
| *G08B 21/24* | (2006.01) |
| *H04M 1/60* | (2006.01) |

(56) References Cited

U.S. PATENT DOCUMENTS

| | | | |
|---|---|---|---|
| 6,862,443 B2 | 3/2005 | Witte | |
| 6,917,801 B2 | 7/2005 | Witte et al. | |
| 6,996,402 B2 | 2/2006 | Logan et al. | |
| 7,050,795 B2 | 5/2006 | Wiegand et al. | |
| 7,271,715 B2 | 9/2007 | Aupperle et al. | |
| 8,035,503 B2 * | 10/2011 | Partin et al. | 340/457 |
| 8,629,767 B2 * | 1/2014 | Stefanovski et al. | 340/457 |
| 2008/0143478 A1 * | 6/2008 | Sugiura et al. | 340/5.61 |

FOREIGN PATENT DOCUMENTS

| | | |
|---|---|---|
| EP | 0 787 634 | 8/1997 |
| EP | 1 000 826 | 5/2000 |
| GB | 2 349 257 | 10/2000 |
| WO | 2010/088019 | 8/2010 |

OTHER PUBLICATIONS

"Bringrr Launches New Accessory to Help Users Remember to Take Their Cell Phones," New York, Jun. 22, 2010, (2 pages).

"Competitive Analysis," Bringrr Systems, LLC, 2010, www.bringrr.com, (2 pages).

"Never Forget Your Phone Again," Bringrr Systems, LLC, 2010, www.bringrr.com, (2 pages).

Lambert Varias, "Bringrr Phone Alarm: For Cars, Not for People," Technabob, Sep. 13, 2010, [retrieved from http://technabob.com/blog/2010/09/13/bringrr-phone-alarm/ on Oct. 14, 2010] (9 pages).

John Brownlee, "Bringrr Alarm Plugs Into Your Car's Cigarette Lighter, Makes Sure You Have Your Cell Phone," Geek.com, Jun. 23, 2010, [retrieved from http://www.geek.com/articles/gadgets/bringrr-alarm-plugs-into-your-cars-cigarette-lighter-makes-sure-you-have-your-cell-phone-20100623/ on Oct. 14, 2010] (10 pages).

Partho, "How Not to Lose your Mobile Phone," Gaea News Network, Apr. 14, 2010, [retrieved from http://tech.gaeatimes.com/index.php/archive/how-not-to-lose-your-mobile-phone/ on Mar. 4, 2011] (2 pages).

Ben Bunag, "How to Pair Bluetooth-Enabled Devices, Such as Car to Phone or Cell Phone to Bluetooth Ear Piece," eHow Presenter, [retrieved from http://web.archive.org/web/20100909183641/http://www.ehow.com/video_4756776_pair-phone-bluetooth-ear-piece.html? on Sep. 20, 2012](13 pages).

Lendino, Jamie, "How to Find a Lost Cell Phone," PCMag.com, May 10, 2010, [retrieved from http://www.pcmag.com/article2/0,2817,2363526,00.asp on Dec. 20, 2012] (5 pages).

Patent Cooperation Treaty, "International Preliminary Report on Patentability," issued by the International Bureau in connection with PCT application No. PCT/US2011/026076, mailed Aug. 27, 2013 (8 pages).

Patent Cooperation Treaty, "International Search Report," issued by the International Searching Authority in connection with PCT application No. PCT/US2011/026076, mailed Dec. 5, 2011 (3 pages).

Patent Cooperation Treaty, "Written Opinion of the International Searching Authority," issued by the International Searching Authority in connection with PCT/US2011/026076, mailed Dec. 5, 2011 (8 pages).

European Patent Office, "Examination Report," issued in connection with European Patent Application No. 11711171.6, on Jun. 18, 2014 (6 pages).

Canadian Intellectual Property Office, "Office Action," issued in connection with Canadian Patent Application No. 2,827,838, Nov. 4, 2014 (4 pages).

\* cited by examiner

METHODS AND APPARATUS TO DETECT MOBILE DEVICES

RELATED APPLICATIONS

This is a US national phase application under 35 USC 371 of International Application No. PCT/US2011/026076, filed on Feb. 24, 2011, which is hereby incorporated herein by reference in its entirety.

FIELD OF THE DISCLOSURE

The present disclosure relates generally to communication devices and, more particularly, to methods and apparatus to detect mobile devices.

BACKGROUND

Wireless radio communication technologies are used in many devices to enable such devices to establish wireless connections with one another. Such wireless radio communication technologies include Bluetooth® wireless technology, IEEE® 802.11 wireless technology, and other wireless technologies capable of wireless connections. In some instances, such wireless technologies enable mobile devices to establish wireless connections with vehicles. However, oftentimes persons may forget their mobile devices, such as mobile phones, and drive away from a location in their vehicle while unintentionally leaving their mobile devices behind. In addition, persons may unintentionally leave their mobile devices in their vehicles and walk away from their vehicles to their intended destination while unintentionally leaving their mobile devices behind.

DETAILED DESCRIPTION

Figure 1:
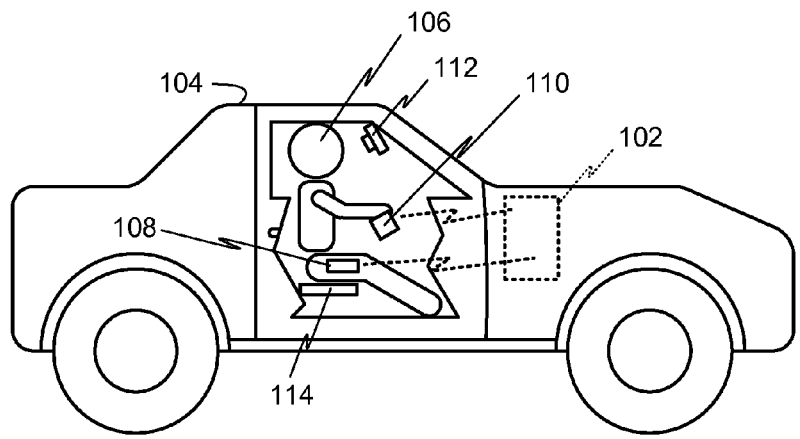
FIG. 1 depicts an example mobile device detector located in a vehicle to detect the presence of a person and a corresponding mobile device.

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

It will be appreciated that, for simplicity and clarity of illustration, where considered appropriate, reference numerals may be repeated among the figures to indicate corresponding or analogous elements. In addition, numerous specific details are set forth in order to provide a thorough understanding of example embodiments disclosed herein. However, it will be understood by those of ordinary skill in the art that example embodiments disclosed herein may be practiced without these specific details. In other instances, well-known methods, procedures and components have not been described in detail so as not to obscure example embodiments disclosed herein. Also, the description is not to be considered as limiting the scope of example embodiments disclosed herein.

Example methods, apparatus, and articles of manufacture are disclosed herein in connection with mobile devices, which may be any mobile communication device, mobile computing device, or any other element, entity, device, or service capable of communicating wirelessly. Mobile devices, also referred to as terminals, wireless terminals, mobile stations, communication stations, or user equipment (UE), may include mobile smart phones (e.g., BlackBerry® smart phones), wireless personal digital assistants (PDA), tablet/laptop/notebook/netbook computers with wireless adapters, etc. Example methods, apparatus, and articles of manufacture are disclosed herein in connection with Bluetooth® wireless communication technologies. However, such disclosed example methods, apparatus, and articles of manufacture may additionally or alternatively be implemented in connection with other wireless communication standards including the wireless local area network (WLAN) communication standard known as IEEE® 802.11, ZIGBEE® radio technology, wireless USB radio technology, and ultra-wideband (UWB) radio technology, or any other WLAN standards or personal area network (PAN) standards.

As used herein, a vehicle refers to any engine-powered or motor-powered vehicle capable of transporting people. As such, the term vehicle, as used herein, includes cars, trucks, busses, semis, construction vehicles, farm vehicles, tractors, recreational vehicles (RVs), campers, motorcycles, boats, airplanes, and/or any other engine-powered or motor-powered vehicle capable of transporting people.

Example methods, apparatus, and articles of manufacture disclosed herein may be used to notify or alert persons of forgotten or missing mobile devices upon entering or exiting vehicles. Such example methods, apparatus, and articles of manufacture enable informing a person that the person has forgotten their mobile device when either (a) the person is located inside of (e.g., has entered) a vehicle and the mobile device of the person is not located in the vehicle or (b) the person is outside of (e.g., has exited) a vehicle and the mobile device of the person is located in the vehicle. In the first scenario, the vehicle (or a mobile device detector in the vehicle) alerts or notifies the person of the missing mobile device in case the person has accidentally forgotten the mobile device. In this manner, the person may retrieve the mobile device before driving away in the vehicle. In the second scenario, the vehicle (or a mobile device detector in the vehicle) alerts or notifies the person if the mobile device is still located inside the vehicle after the person has exited the vehicle. In this manner, the person may return to the vehicle to retrieve the mobile device before walking away from the vehicle.

In some examples, example techniques disclosed herein may be used to implement forgotten mobile phone reminder systems for use in vehicles. Often times a person may get into a vehicle and drive away from a location at which the person has forgotten their mobile phone. Example methods, apparatus, and articles of manufacture disclosed herein enable vehicles to notify persons located therein when the mobile phones associated with those persons are not also located in the vehicles. Example methods, apparatus, and articles of manufacture disclosed herein also enable vehicles to notify persons when they have exited vehicles, but their mobile phones are detected as still being located in the vehicles.

In some examples, persons are detected and identified based on identification tags worn or carried by those persons. Such identification tags may be embedded in vehicle keys or key fobs or any other item typically worn or carried by a person when travelling in a vehicle. Example identification tags may be implemented using radio frequency identification (RFID) devices or any other suitable wireless transceiver that may be used to transmit identifiers suitable for identifying a person. Additionally or alternatively, persons in a vehicle may be identified using image recognition processes based on images collected by imaging devices (e.g., cameras) located and/or mounted in a cabin of a vehicle.

To determine which mobile devices are associated with respective persons, a mobile device detector in a vehicle associates mobile device identifiers with user identifiers. In some examples, mobile device identifiers may be based on identifiers used by vehicle Bluetooth® systems to pair with and identify mobile phones. The user identifiers may be identifiers detectable or retrievable from identification tags worn or carried by respective persons. In this manner, example methods, apparatus, and articles of manufacture disclosed herein enable a vehicle to register several persons and their corresponding mobile devices so that the vehicle can alert any person missing a corresponding mobile device whenever one or more of the registered persons is in the vehicle and the mobile device(s) of any one or more of those persons is not located in the vehicle.

Turning to FIG. 1, an example mobile device detector 102 is shown located in a vehicle 104 to detect the presence of a person 106 and a corresponding mobile device 108. In the illustrated example, the mobile device 108 is a mobile phone (e.g., a cellular phone), but may alternatively be any other mobile device that may be carried or worn by a person. In the illustrated example, the person 106 is shown carrying an identification tag 110 embedded or provided in a key fob. However, the identification tag 110 may be provided in any other article or device typically expected to be carried or worn by a person when in a vehicle. In the illustrated example, the identification tag 110 has a wireless communication subsystem (e.g., a wireless transceiver) to transmit a user identifier (e.g., an identifier, a unique identifier, or a unique user identifier) associated with the person 106. The mobile device detector 102 of the illustrated example uses the user identifier transmitted by the identification tag 110 to uniquely identify when the person 106 is located in the vehicle 104. In the illustrated example, the identification tag 110 may be implemented using an RFID wireless transceiver device or any other suitable wireless transceiver device capable of transmitting identifiers suitable for identifying a person.

In the illustrated example of FIG. 1, the mobile device detector 102 is provided with a wireless communication system (e.g., a Bluetooth® communication system or any other suitable wireless communication system) that implements a mobile device wireless interface (e.g., a mobile device wireless interface 516 of FIG. 5) to pair and/or connect with mobile devices to enable persons in the vehicle 104 to make hands-free telephone calls and/or to enable transferring data and/or media between mobile devices and the vehicle 104. The mobile device detector 102 of the illustrated example is also provided with an identification tag transceiver (e.g., an identification tag wireless interface 514 of FIG. 5) to receive user identifiers from identification tags such as the identification tag 110 to determine when respective persons are located in the vehicle 104.

During a registration process in which the person 106 initially registers and connects the mobile device 108 with the vehicle 104, the mobile device detector 102 receives a mobile device identifier to uniquely identify the mobile device 108 and a user identifier from the identification tag 110 to uniquely identify the person 106. At any subsequent time after registering, the mobile device detector 102 can notify or alert the person 106 whenever the person 106 is detected as being located in the vehicle 104 (e.g., based on detection of the identification tag 110 in the vehicle 104) but the mobile device 108 is not detected as being located in the vehicle 104 (e.g., a connection between the vehicle 104 and the mobile device 108 is not detected) or when the person 106 is not detected as being located in the vehicle 104, but the mobile device 108 is detected as being located in the vehicle 104 (e.g., a connection between the vehicle 104 and the mobile device 108 is detected).

In some examples, the mobile device detector 102 may be configured to additionally or alternatively use image recognition processes to detect and identify persons (e.g., the person 106) in the vehicle 104. In the illustrated example of FIG. 1, the vehicle 104 is shown as being provided with an in-cabin camera (or imaging sensor) 112 that collects and provides digital images of vehicle occupants to the mobile device detector 102. The mobile device detector 102 can then perform facial recognition processes on the digital image data to identify persons located in the vehicle 104. In such examples, unique facial identities of persons (e.g., the person 106) are used as user identifiers that the mobile device detector 102 maps or associates with mobile device identifiers of mobile devices (e.g., the mobile device 108). In such examples, the mobile device detector 102 may use such facial recognition techniques instead of communicating with identification tags (e.g., the identification tag 110) to identify persons. In other examples, the mobile device detector 102 may be configured to use both facial recognition techniques and interrogations of identification tags (e.g., the identification tag 110) to identify persons in the vehicle 104. In this manner, the mobile device detector 102 may register persons associated with identification tags and persons that typically carry respective mobile devices but that do not have identification tags (e.g., persons that do not have keys or key fobs to drive the vehicle 104) such as children, teenagers, or other family or household members that are not associated with driving privileges for the vehicle 104.

In the illustrated example of FIG. 1, the vehicle 104 is also provided with an occupant detector 114, which may be implemented using a pressure sensor or weight sensor in a seat of the vehicle 104. In some examples, the occupant detector 114 may be used to trigger the mobile device detector 102 to interrogate any present identification tags (e.g., the identification tag 110) or to collect digital images using, for example, the in-cabin camera 112. Although only one occupant detector 114 is shown, occupant detectors may be provided in each seat of the vehicle 104 to determine where occupants are located in the vehicle 104. In other examples, the occupant detector 114 may alternatively or additionally be implemented as an ignition detector that detects when a key has been inserted into a vehicle ignition and/or turned to a particular key ignition position (e.g., an accessory position, an on position, a start position). In yet other examples, the occupant detector 114 may be omitted and the mobile device detector 102 may be configured to periodically poll for the presence of any identification tags (e.g., the identification tag 110) in the vehicle 104 and/or the in-cabin camera 112 may periodically collect digital images to determine whether any occupants are in the vehicle 104.

Figure 2:
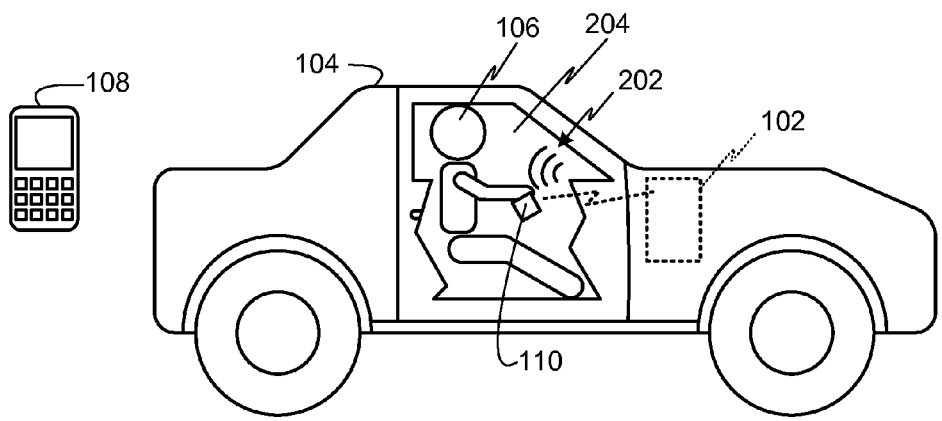
FIG. 2 depicts the example mobile device detector of FIG. 1 notifying a person located in the vehicle of a missing mobile device.

Turning to FIG. 2, the example mobile device detector 102 of FIG. 1 notifies the person 106 located in the vehicle 104 that the mobile device 108 is not located in the vehicle 104. That is, when the mobile device detector 102 of the illustrated example detects that the person 106 is located in the vehicle 104 (e.g., based on detecting the identification tag 110) but does not detect that the mobile device 108 is located in the vehicle 104 (e.g., does not detect a connection with the mobile device 108), the mobile device detector 102 provides a notification or alert 202 (e.g., an audio alert) to the person 106 to notify the person 106 about the missing mobile device 108. In this manner, if the person 106 has accidentally forgotten the mobile device 108, the notification serves as a reminder that the person 106 should retrieve the mobile device 108 from its present location before driving away.

In some examples, the mobile device detector 102 is configured to provide missing mobile device notifications (e.g., the notification or alert 202) to be heard inside the vehicle 104 or outside the vehicle 104 (e.g., as described below in connection with FIG. 3) depending on whether a person (e.g., the person 106) is detected as being located in the vehicle 104 or not detected as being located in the vehicle 104. If the person 106 is located in the vehicle 104 as shown in FIG. 2, the notification 202 can be a discreet, relatively lower volume chime, beep, or other audible sound (e.g., spoken/synthesized words informing of a missing mobile device(s) or specifically identifying which mobile device(s) is/are missing) heard only within a cabin 204 of the vehicle 104. In this manner, if the person 106 is located in the vehicle 104, providing the notification 202 within the cabin 204 usefully prevents needing to make loud disturbances or create nuisances to others outside of the vehicle 104. If the person 106 is not detected as being located in the vehicle 104 but has left the mobile device 108 in the vehicle 104, the vehicle 104 can provide an external notification (e.g., as described below in connection with FIG. 3) audible outside of the vehicle 104. In the illustrated example of FIG. 2, the mobile device detector 102 causes the notification 202 to be provided (e.g., emitted) from an audio emitter to the internal cabin 204 of the vehicle 104, because the person 106 is detected as being located in the vehicle 104.

Figure 3:
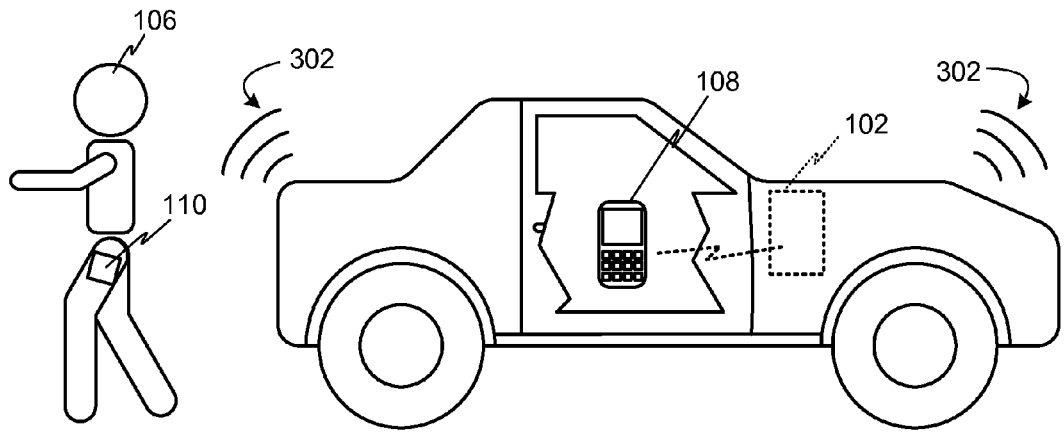
FIG. 3 depicts the example mobile device detector of FIGS. 1 and 2 notifying a person located outside of the vehicle of a mobile device located in the vehicle.

Turning to FIG. 3, the example mobile device detector 102 of FIGS. 1 and 2 notifies the person 106 located outside of the vehicle 104 that the mobile device 108 is located in the vehicle 104. That is, when the mobile device detector 102 of the illustrated example detects that the person 106 is not located in the vehicle 104 (e.g., based on not detecting the identification tag 110) but detects that the mobile device 108 is located in the vehicle 104 (e.g., detects a connection with the mobile device 108), the mobile device detector 102 provides a notification or alert 302 (e.g., an audio alert) to notify the person 106 about the mobile device 108 left behind. In this manner, if the person 106 has accidentally forgotten the mobile device 108 in the vehicle 104, the notification serves as a reminder that the person 106 should retrieve the mobile device 108 from the vehicle 104 before walking away.

In the illustrated example of FIG. 3, the mobile device detector 102 detects that the person 106 is not located in the vehicle 104 and, as such, provides the notification or alert 302 as an external notification audible outside of the vehicle 104. In the illustrated example of FIG. 3, the mobile device detector 102 causes the notification 302 to be provided (e.g., emitted) via an audio emitter to an area outside of the vehicle 104, because the person 106 is detected as not being located in the vehicle 104. Such an audio emitter may be a vehicle alarm system or a vehicle horn system audible outside of the vehicle 104.

Figure 4:
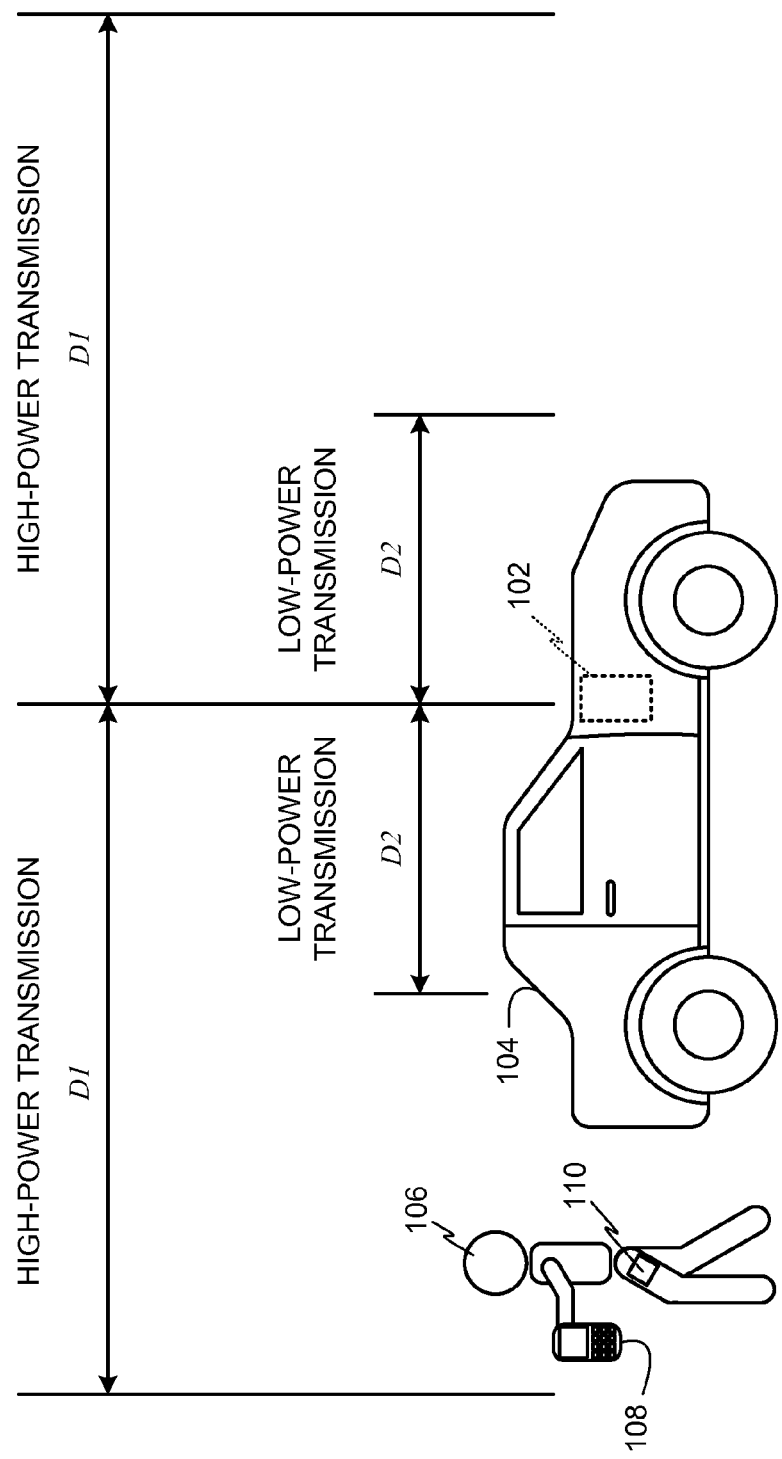
FIG. 4 depicts communication ranges of low-power and high-power transmission modes in which the example mobile device detector of FIGS. 1-3 is operable.

FIG. 4 depicts communication ranges of low-power and high-power transmission modes in which the example mobile device detector 102 of FIGS. 1-3 is operable to communicate with the mobile device 108 (or any other mobile devices) via, for example, Bluetooth® wireless connections or any other suitable wireless technology. In the illustrated example, to prevent incorrectly notifying the person 106 that the mobile device 108 has been left in the vehicle 104 when the person 106 is not in the vehicle 104 and is in possession of the mobile device 108, the mobile device detector 102 is configured to transition between the low-power and high-power transmission modes based on whether the person 106 is detected as being located in the vehicle 104.

In the illustrated example of FIG. 4, a mobile device wireless transceiver (e.g., the mobile device wireless interface 516 of FIG. 5) of the vehicle 104 is configured to operate in the high-power transmission mode when the person 106 is located in the vehicle 104. The high-power transmission mode provides an increased likelihood of a connection with a stronger signal strength between the vehicle 104 and the mobile device 108. Using the high-power transmission mode can be useful for instances in which the mobile device 108 is carried, stored, buried, or located in places having signal-attenuating materials. Such storage or carrying locations may be purses, bags, luggage, briefcases, heavy coats or clothing, boxes, laptop cases, etc. In some examples, the high-power transmission mode also usefully enables higher data rates between mobile devices and vehicle communication systems. Thus, using the high-power transmission mode to maintain a wireless connection between the vehicle 104 and the mobile device 108 increases the likelihood that the wireless connection will be an acceptable high-performing connection. However, the high-power transmission mode enables the vehicle 104 to maintain a connection with the mobile device 108 up to a relatively long communication range (e.g., a distance D1 shown in FIG. 4 relative to the mobile device detector 102), while the identification tag 110 is detectable by the vehicle 104 within only a relatively shorter communication range (e.g., a distance D2 shown in FIG. 4 or any other distance shorter than D1 relative to the mobile device detector 102). Thus, keeping the mobile device wireless transceiver (e.g., the mobile device wireless interface 516 of FIG. 5) of the vehicle 104 in the high-power transmission mode when the person 106 is no longer located in the vehicle 104 may cause the mobile device detector 102 to maintain a wireless connection with the mobile device 108 when the mobile device 108 is no longer located in the vehicle 104 and, thereby, incorrectly determine that the mobile device 108 is still located in the vehicle 104. In turn, delivery or emission of the notification or alert 302 (FIG. 3) by the mobile device detector 102 may cause confusion and/or annoyance to the person 106, because the person 106 is in possession of the mobile device 108, while the notification 302 suggests that the mobile device 108 is in the vehicle 104.

To substantially eliminate or reduce false or incorrect forgotten mobile device notifications (e.g., the notification 302), the mobile device detector 102 of the illustrated example is configured to transition the mobile device wireless transceiver of the vehicle 104 from the high-power transmission mode (providing wireless coverage within the distance D1 from the vehicle 104 and/or the mobile device detector 102) to the low-power transmission mode to reduce wireless coverage (e.g., a reduced communication range) to within the distance D2 (or any other distance shorter than D1) from the vehicle 104 and/or the mobile device detector 102. As such, when the mobile device detector 102 detects that the person 106 is located in the vehicle 104 (e.g., based on detecting the identification tag 110), the mobile device detector 102 transitions the mobile device wireless transceiver of the vehicle 104 to the high-power transmission mode. When the mobile device detector 102 no longer detects the person 106 as being located in the vehicle 104, the mobile device detector 102 transitions the mobile device wireless transceiver of the vehicle 104 to the low-power transmission mode to reduce a communication range (e.g., a reduced communication range within the distance D2 or any other suitable distance shorter than D1) of the mobile device wireless transceiver of the vehicle 104. In this manner, if the person 106 is in possession of the mobile device 108 when the person 106 is outside of the vehicle 104, the vehicle 104 loses a connection with the mobile device 108 and, thus, the mobile device detector 102 does not incorrectly determine that the mobile device 108 is in the vehicle 104. However, if the mobile device 108 is in the vehicle 104 when the person 106 is outside of the vehicle 104, the vehicle 104 and the mobile device 108 will remain connected when the mobile device wireless transceiver of the vehicle 104 is in the low-power transmission mode (e.g., using a reduced communication range) and the mobile device detector 102 will correctly notify the person 106 that the mobile device 106 remains in the vehicle 104.

Figure 5:
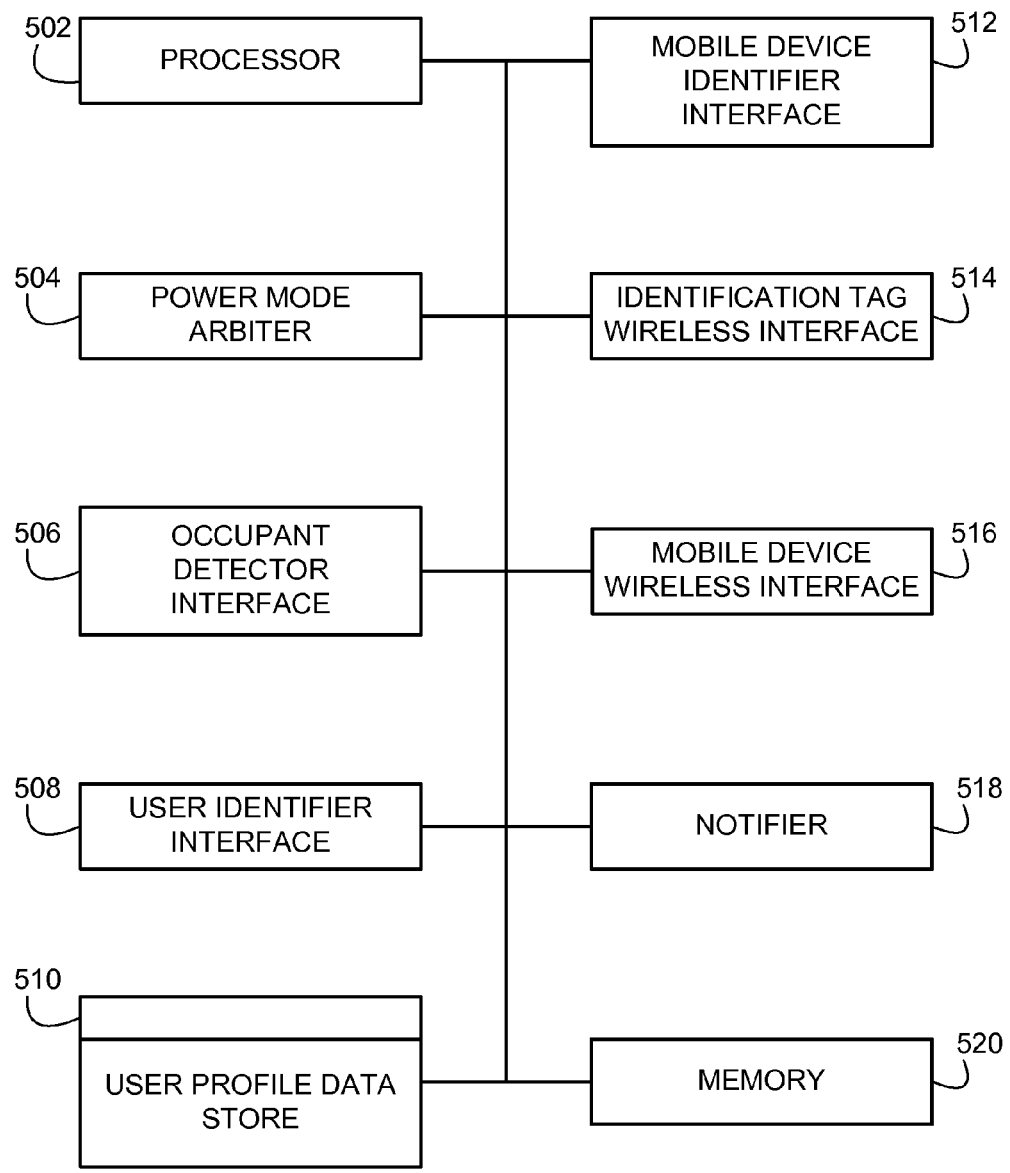
FIG. 5 depicts an example apparatus that may be used to implement the example mobile device detector of FIGS. 1-4.

FIG. 5 depicts an example apparatus 500 that may be used to implement the example mobile device detector 102 of FIGS. 1-4. In the illustrated example of FIG. 5, the apparatus 500 is provided with a processor (or controller) 502, a power mode arbiter 504, an occupant detector interface 506, a user identifier interface 508, a user profile data store 510, a mobile device identifier interface 512, an identification tag wireless interface 514, a mobile device wireless interface 516, a notifier 518, and a memory 520. The processor 502, the power mode arbiter 504, the occupant detector interface 506, the user identifier interface 508, the user profile data store 510, the mobile device identifier interface 512, the identification tag wireless interface 514, the mobile device wireless interface 516, the notifier 518, and/or the memory 520 may be implemented using any desired combination of hardware, firmware, and/or software. For example, one or more integrated circuits, discrete semiconductor components, and/or passive electronic components may be used. Thus, for example, the processor 502, the power mode arbiter 504, the occupant detector interface 506, the user identifier interface 508, the user profile data store 510, the mobile device identifier interface 512, the identification tag wireless interface 514, the mobile device wireless interface 516, the notifier 518, and/or the memory 520, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The processor 502, the power mode arbiter 504, the occupant detector interface 506, the user identifier interface 508, the user profile data store 510, the mobile device identifier interface 512, the identification tag wireless interface 514, the mobile device wireless interface 516, the notifier 518, and/or the memory 520, or parts thereof, may be implemented using instructions, code, and/or other software and/or firmware, etc. stored on a machine accessible medium or computer readable medium (e.g., the memory 520) and executable by, for example, a processor (e.g., the example processor 502). When any of the appended claims are read to cover a purely software implementation, at least one of the processor 502, the power mode arbiter 504, the occupant detector interface 506, the user identifier interface 508, the user profile data store 510, the mobile device identifier interface 512, the identification tag wireless interface 514, the mobile device wireless interface 516, the notifier 518, or the memory 520 is hereby expressly defined to include a tangible medium such as a solid state memory, a magnetic memory, a DVD, a CD, etc.

Turning in detail to FIG. 5, the apparatus 500 of the illustrated example is provided with the example processor 502 to control and/or manage operations of the mobile device detector 102. In the illustrated example, the processor 502 receives information from one or more of the power mode arbiter 504, the occupant detector interface 506, the user identifier interface 508, the user profile data store 510, the mobile device identifier interface 512, the identification tag wireless interface 514, the mobile device wireless interface 516, the notifier 518, and/or the memory 520 and makes decisions and facilitates information exchange in and outside of the mobile device detector 502.

In the illustrated example, to determine when to effect transitions between the high-power transmission mode and the low-power transmission mode described in connection with FIG. 4, the apparatus 500 is provided with the example power mode arbiter 504. In the illustrated example, the power mode arbiter 504 receives notices or other indications of whether the person 106 is located in the vehicle 104 (e.g., based on detections of the identification tag 110) as shown in FIGS. 1 and 2 or is not located in the vehicle 104 as shown in FIGS. 3 and 4. The power mode arbiter 504 of the illustrated example uses such indications of detection or non-detection of the person 106 to cause the mobile device wireless interface 516 to transition between the high-power transmission mode and the low-power transmission mode.

In the illustrated example, to determine whether one or more occupants (e.g., the person 106 and/or any other person) are in the vehicle 104, the apparatus 500 is provided with the occupant detector interface 506. In the illustrated example, the occupant detector interface 506 may interface with any device, system and/or process used to detect occupants. For example, the occupant detector 506 may interface with the occupant detector 114 of FIG. 1, the in-cabin camera 112 of FIG. 1, an ignition switch of the vehicle 104, and/or any other devices, systems and/or processes provided to detect one or more occupants in the vehicle 104. In some examples, the occupant detector interface 506 may receive notifications from the identification tag wireless interface 514 that it has detected an identification tag (e.g., the identification tag 110 of FIGS. 1-4) through, for example, a successful interrogation through a periodic polling process.

In the illustrated example, to determine which persons are located in the vehicle 104, the apparatus 500 is provided with the user identifier interface 508. The user identifier interface 508 of the illustrated example receives data, messages, and/or responses that the identification tag wireless interface 514 receives from identification tags (e.g., the identification tag 110 of FIGS. 1-4) and retrieves or extracts user identifications or user identifiers from the received data, messages, and/or responses. Based on a retrieved user identifier associated with a person (e.g., the person 106 of FIGS. 1-4), the apparatus 500 can determine a corresponding mobile device (e.g., the mobile device 108) associated with the identified person.

In the illustrated example, to map or associate mobile device identifiers with corresponding user identifiers, the apparatus 500 is provided with the user profile data store 510. The user profile data store 510 of the illustrated example stores a data structure or look-up table in which user identifiers for respective persons (e.g., the person 106 of FIGS. 1-4) registered with the vehicle 104 are stored in association with respective mobile device identifiers identifying mobile devices (e.g., the mobile device 108 of FIGS. 1-4) corresponding to those persons. The example user profile data store 510 receives user identifiers and corresponding mobile device identifiers during registration processes via which persons initially pair or connect corresponding mobile devices with a wireless communication system of the vehicle 104. That is, the apparatus 500 can receive mobile device identifiers based on the pairing or connecting processes. During such processes, the apparatus 500 can also receive corresponding user identifiers from the user identifier interface 508 based on interrogations performed by the identification tag wireless interface 514 of identification tags (e.g., the identification tag 110 of FIGS. 1-4) of registering persons (e.g., the person 106). The user profile data store 510 can then store the received user identifiers in association with received mobile device identifiers. A mobile device identifier can be subsequently retrieved from the user profile data store 510 whenever a corresponding registered person 106 is detected as being located in the vehicle 104 based on the user identifier received from the identification tag 110.

In the illustrated example, to determine which mobile devices are located in the vehicle 104, the apparatus 500 is provided with the mobile device identifier interface 512. The mobile device identifier interface 512 of the illustrated example receives data, messages, and/or responses that the mobile device wireless interface 516 receives from mobile devices (e.g., the mobile device 108 of FIGS. 1-4) and retrieves or extracts mobile device identifications or mobile device identifiers from the received data, messages, and/or responses. The apparatus 500 can then store the retrieved mobile device identifiers with corresponding user identifiers in the user profile data store 510. In addition, the mobile device identifier interface 516 can be used to determine which mobile devices are located in the vehicle 104 when persons associated with those mobile devices are not located in the vehicle 104.

To communicate with identification tags (e.g., the identification tag 110 of FIGS. 1-4), the example apparatus 500 is provided with the identification tag wireless interface 514. In the illustrated example, the identification tag wireless interface 514 is an RFID wireless transceiver and the identification tag 110 may have an active or passive RFID wireless transceiver to communicate with the identification tag wireless interface 514. However, the identification tag wireless interface 514 may alternatively be implemented using any other suitable wireless technology type transceiver suitable for interrogating the identification tag 110. In some examples, the identification tag wireless interface 514 may be a communication interface connected to an RFID wireless transceiver (or other suitable wireless technology type transceiver) located elsewhere in the vehicle 104 and suitable for interrogating the identification tag 110.

To communicate with mobile devices (e.g., the mobile device 108 of FIGS. 1-4), the example apparatus 500 is provided with the mobile device wireless interface 516. In the illustrated example, the mobile device wireless interface 516 is a Bluetooth® wireless transceiver and the mobile device 108 is provided with a Bluetooth® wireless transceiver to pair, connect, and communicate with the mobile device wireless interface 516. However, the mobile device wireless interface 516 may alternatively be implemented using any other suitable wireless technology type transceiver suitable for pairing, connecting, and/or communicating with mobile devices. In some examples, the mobile device wireless interface 516 may be a communication interface connected to a Bluetooth® wireless transceiver (or other suitable wireless technology type transceiver) located or installed elsewhere in the vehicle 104 and suitable for pairing, connecting, and/or communicating with the mobile device 108.

In the illustrated example, the mobile device wireless interface 516 is configured to or operable to wirelessly connect with one or more mobile devices (e.g., the mobile device 108) using a high-power transmission power mode when the mobile device(s) is/are located within a first distance (e.g., the distance D1 shown in FIG. 4) from the mobile device wireless interface 516 (or the mobile device detector 102 or the vehicle 104). The mobile device wireless interface 516 is also configured to or operable to wirelessly connect with one or more mobile devices using a low-power transmission mode to communicate with the mobile device(s) when the mobile device (s) is/are located within a second distance (e.g., the distance D2 shown in FIG. 4) from the mobile device wireless interface 516 (or the mobile device detector 102 or the vehicle 104) and not located further than the second distance (D2) from the mobile device wireless interface 516 (or the mobile device detector 102 or the vehicle 104). As shown in FIG. 4, the second distance (D2) associated with the low-power transmission mode is shorter than the first distance (D1) associated with the high-power transmission mode.

To provide notifications or alerts that one or more persons (e.g., the person 106 of FIGS. 1-4) is in the vehicle 104 without their mobile device(s) (e.g., the mobile device 108 of FIGS. 1-4) or has exited the vehicle 104 and left their mobile device(s) in the vehicle 104, the example apparatus 500 is provided with the notifier 518. In the illustrated example, the notifier 518 is interfaceable or connectable to one or more sound/audio systems of the vehicle 104 to provide notifications or alerts. For example, in the illustrated examples of FIGS. 2 and 3, the notifier 518 is connected to an in-cabin sound system (e.g., a stereo system, an in-cabin audio notification system capable of emitting beeps or spoken/synthesized words, etc.) and a vehicle-exterior sound system (e.g., a vehicle alarm system, a vehicle horn system, etc.). In this manner, the notifier 518 can provide in-cabin alerts when the person 106 is located in the vehicle 104 and/or can provide a notification or alert audible outside the vehicle 104 when the person 106 is not located in the vehicle 104. Decisions on whether to emit an in-cabin notification (e.g., the notification 202 of FIG. 2) or exterior notifications (e.g., the notification 302 of FIG. 3) may be made by the processor 502 based on whether the person 104 is detected as being located in the vehicle 104 or not detected as being located in the vehicle 104. The processor 502 can then cause the notifier 518 to provide a suitable one of the in-cabin or exterior notifications.

In the illustrated example, to store data and/or machine-readable or computer-readable instructions, the apparatus 500 is provided with the memory 520. The memory 520 may be a mass storage memory magnetic or optical memory, a non-volatile integrated circuit memory, or a volatile memory. That is, the memory 520 may be any tangible medium such as a solid state memory, a magnetic memory, a DVD, a CD, etc.

Figure 6:
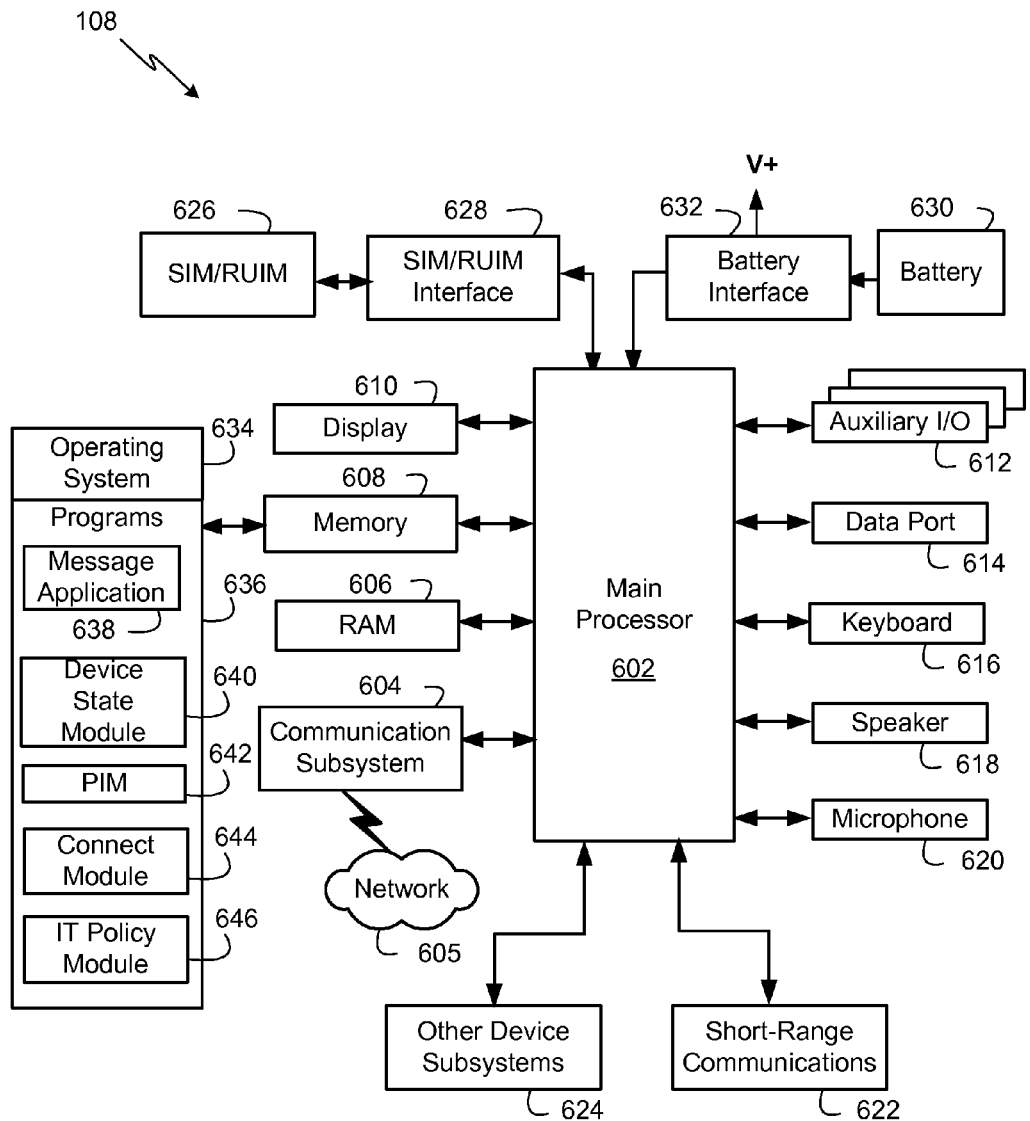
FIG. 6 depicts an example block diagram of the mobile device of FIGS. 1-4.

FIG. 6 depicts a block diagram of an example implementation of a processor system that may be used to implement the mobile device 108 of FIGS. 1-4. In the illustrated example, the mobile device 108 is a two-way communication device with advanced data communication capabilities including the capability to communicate with other wireless-enabled devices or computer systems through a network of transceiver stations. The mobile device 108 may also have the capability to allow voice communication. Depending on the functionality provided by the mobile device 108, it may be referred to as a data messaging device, a two-way pager, a cellular telephone with data messaging capabilities, a smart phone, a wireless Internet appliance, or a data communication device (with or without telephony capabilities). To aid the reader in understanding the structure of the mobile device 108 and how it communicates with other devices and host systems, FIG. 6 will now be described in detail.

Referring to FIG. 6, the mobile device 108 includes a number of components such as a main processor 602 that controls the overall operation of the mobile device 108. Communication functions, including data and voice communications, are performed through a communication subsystem 604. The communication subsystem 604 receives messages from and sends messages to a wireless network 605. In the illustrated example of the mobile device 108, the communication subsystem 604 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example implementations described herein are intended to use any other suitable standards that are developed in the future. The wireless link connecting the communication subsystem 604 with the wireless network 605 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 605 associated with the mobile device 108 is a GSM/GPRS wireless network in one exemplary implementation, other wireless networks may also be associated with the mobile device 108 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, MOBITEX® and DATATAC® network communication systems. Examples of other voice-centric data networks include Personal Communication Systems (PCS) networks like GSM and Time Division Multiple Access (TDMA) systems.

The main processor 602 also interacts with additional subsystems such as a Random Access Memory (RAM) 606, a persistent memory 608 (e.g., a non-volatile memory), a display 610, an auxiliary input/output (I/O) subsystem 612, a data port 614, a keyboard 616, a speaker 618, a microphone 620, short-range communications 622, and other device subsystems 624.

Some of the subsystems of the mobile device 108 perform communication-related functions, whereas other subsystems may provide "resident" or on-device functions. By way of example, the display 610 and the keyboard 616 may be used for both communication-related functions, such as entering a text message for transmission over the network 605, and device-resident functions such as a calculator or task list.

The mobile device 108 can send and receive communication signals over the wireless network 605 after required network registration or activation procedures have been completed. Network access is associated with a subscriber or user of the mobile device 108. To identify a subscriber, the mobile device 108 requires a SIM/RUIM card 626 (i.e. Subscriber Identity Module or a Removable User Identity Module) to be inserted into a SIM/RUIM interface 628 in order to communicate with a network. The SIM card or RUIM 626 is one type of a conventional "smart card" that can be used to identify a subscriber of the mobile device 108 and to personalize the mobile device 108, among other things. Without the SIM card 626, the mobile device 108 is not fully operational for communication with the wireless network 605. By inserting the SIM card/RUIM 626 into the SIM/RUIM interface 628, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 626 includes a processor and memory for storing information. Once the SIM card/RUIM 626 is inserted into the SIM/RUIM interface 628, it is coupled to the main processor 602. In order to identify the subscriber, the SIM card/RUIM 626 can include some user parameters such as an International Mobile Subscriber Identity (IMSI). An advantage of using the SIM card/RUIM 626 is that a subscriber is not necessarily bound by any single physical mobile device. The SIM card/RUIM 626 may store additional subscriber information for a mobile device as well, including datebook (or calendar) information and recent call information. Alternatively, user identification information can also be programmed into the persistent memory 608.

The mobile device 108 is a battery-powered device and includes a battery interface 632 for receiving one or more rechargeable batteries 630. In at least some embodiments, the battery 630 can be a smart battery with an embedded microprocessor. The battery interface 632 is coupled to a regulator (not shown), which assists the battery 630 in providing power V+ to the mobile device 108. Although current technology makes use of a battery, future technologies such as micro fuel cells may provide the power to the mobile device 108.

The mobile device 108 also includes an operating system 634 and software components 636 to 646 which are described in more detail below. The operating system 634 and the software components 636 to 646 that are executed by the main processor 602 are typically stored in a persistent store such as the persistent memory 608, which may alternatively be a read-only memory (ROM) or similar storage element (not shown). Those skilled in the art will appreciate that portions of the operating system 634 and the software components 636 to 646, such as specific device applications, or parts thereof, may be temporarily loaded into a volatile store such as the RAM 606. Other software components can also be included, as is well known to those skilled in the art.

The subset of software applications 636 that control basic device operations, including data and voice communication applications, will normally be installed on the mobile device 108 during its manufacture. Other software applications include a message application 638 that can be any suitable software program that allows a user of the mobile device 108 to send and receive electronic messages. Various alternatives exist for the message application 638 as is well known to those skilled in the art. Messages that have been sent or received by the user are typically stored in the persistent memory 608 of the mobile device 108 or some other suitable storage element in the mobile device 108. In at least some embodiments, some of the sent and received messages may be stored remotely from the mobile device 108 such as in a data store of an associated host system that the mobile device 108 communicates with.

The software applications can further include a device state module 640, a Personal Information Manager (PIM) 642, and other suitable modules (not shown). The device state module 640 provides persistence (i.e., the device state module 640 ensures that important device data is stored in persistent memory, such as the persistent memory 608, so that the data is not lost when the mobile device 108 is turned off or loses power).

The PIM 642 includes functionality for organizing and managing data items of interest to the user, such as, but not limited to, e-mail, contacts, calendar events, voice mails, appointments, and task items. A PIM application has the ability to send and receive data items via the wireless network 605. PIM data items may be seamlessly integrated, synchronized, and updated via the wireless network 605 with the mobile device subscriber's corresponding data items stored and/or associated with a host computer system. This functionality creates a mirrored host computer on the mobile device 108 with respect to such items. This can be particularly advantageous when the host computer system is the mobile device subscriber's office computer system.

The mobile device 108 also includes a connect module 644, and an IT policy module 646. The connect module 644 implements the communication protocols that are required for the mobile device 108 to communicate with the wireless infrastructure and any host system, such as an enterprise system, that the mobile device 108 is authorized to interface with.

The connect module 644 includes a set of APIs that can be integrated with the mobile device 108 to allow the mobile device 108 to use any number of services associated with the enterprise system. The connect module 644 allows the mobile device 108 to establish an end-to-end secure, authenticated communication pipe with the host system. A subset of applications for which access is provided by the connect module 644 can be used to pass IT policy commands from the host system (e.g., from an IT policy server of a host system) to the mobile device 108. This can be done in a wireless or wired manner. These instructions can then be passed to the IT policy module 646 to modify the configuration of the mobile device 108. Alternatively, in some cases, the IT policy update can also be done over a wired connection.

The IT policy module 646 receives IT policy data that encodes the IT policy. The IT policy module 646 then ensures that the IT policy data is authenticated by the mobile device 108. The IT policy data can then be stored in the flash memory 606 in its native form. After the IT policy data is stored, a global notification can be sent by the IT policy module 646 to all of the applications residing on the mobile device 108. Applications for which the IT policy may be applicable then respond by reading the IT policy data to look for IT policy rules that are applicable.

The IT policy module 646 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 646 can determine which applications (e.g., pairing or connecting with other devices such as the vehicle 104 of FIGS. 1-4) are affected by the IT policy data and send a notification to only those applications. In either of these cases, for applications that aren't running at the time of the notification, the applications can call the parser or the IT policy module 646 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 646 sends an acknowledgement back to the host system to indicate that the IT policy data was received and successfully applied.

Other types of software applications can also be installed on the mobile device 108. These software applications can be third party applications, which are added after the manufacture of the mobile device 108. Examples of third party applications include games, calculators, utilities, etc.

The additional applications can be loaded onto the mobile device 108 through at least one of the wireless network 605, the auxiliary I/O subsystem 612, the data port 614, the short-range communications subsystem 622, or any other suitable device subsystem 624. This flexibility in application installation increases the functionality of the mobile device 108 and may provide enhanced on-device functions, communication-related functions, or both. For example, secure communication applications may enable electronic commerce functions and other such financial transactions to be performed using the mobile device 108.

The data port 614 enables a subscriber to set preferences through an external device or software application and extends the capabilities of the mobile device 108 by providing for information or software downloads to the mobile device 108 other than through a wireless communication network. The alternate download path may, for example, be used to load an encryption key onto the mobile device 108 through a direct and thus reliable and trusted connection to provide secure device communication.

The data port 614 can be any suitable port that enables data communication between the mobile device 108 and another computing device. The data port 614 can be a serial or a parallel port. In some instances, the data port 614 can be a USB port that includes data lines for data transfer and a supply line that can provide a charging current to charge the battery 630 of the mobile device 108.

The short-range communications subsystem 622 provides for communication between the mobile device 108 and different systems or devices, without the use of the wireless network 605. For example, the subsystem 622 may include an infrared device and associated circuits and components for short-range communication. Examples of short-range communication standards include standards developed by the Infrared Data Association (IrDA), a Bluetooth® communication standard, and the 802.11 family of standards developed by IEEE.

In use, a received signal such as a text message, an e-mail message, web page download, media content, etc. will be processed by the communication subsystem 604 and input to the main processor 602. The main processor 602 will then process the received signal for output to the display 610 or alternatively to the auxiliary I/O subsystem 612. A subscriber may also compose data items, such as e-mail messages, for example, using the keyboard 616 in conjunction with the display 610 and possibly the auxiliary I/O subsystem 612. The auxiliary subsystem 612 may include devices such as: a touch screen, mouse, track ball, infrared fingerprint detector, or a roller wheel with dynamic button pressing capability. The keyboard 616 is preferably an alphanumeric keyboard and/or telephone-type keypad. However, other types of keyboards may also be used. A composed item may be transmitted over the wireless network 605 through the communication subsystem 604.

For voice communications, the overall operation of the mobile device 108 is substantially similar, except that the received signals are output to the speaker 618, and signals for transmission are generated by the microphone 620. Alternative voice or audio I/O subsystems, such as a voice message recording subsystem, can also be implemented on the mobile device 108. Although voice or audio signal output is accomplished primarily through the speaker 618, the display 610 can also be used to provide additional information such as the identity of a calling party, duration of a voice call, or other voice call related information.

Figure 7A:
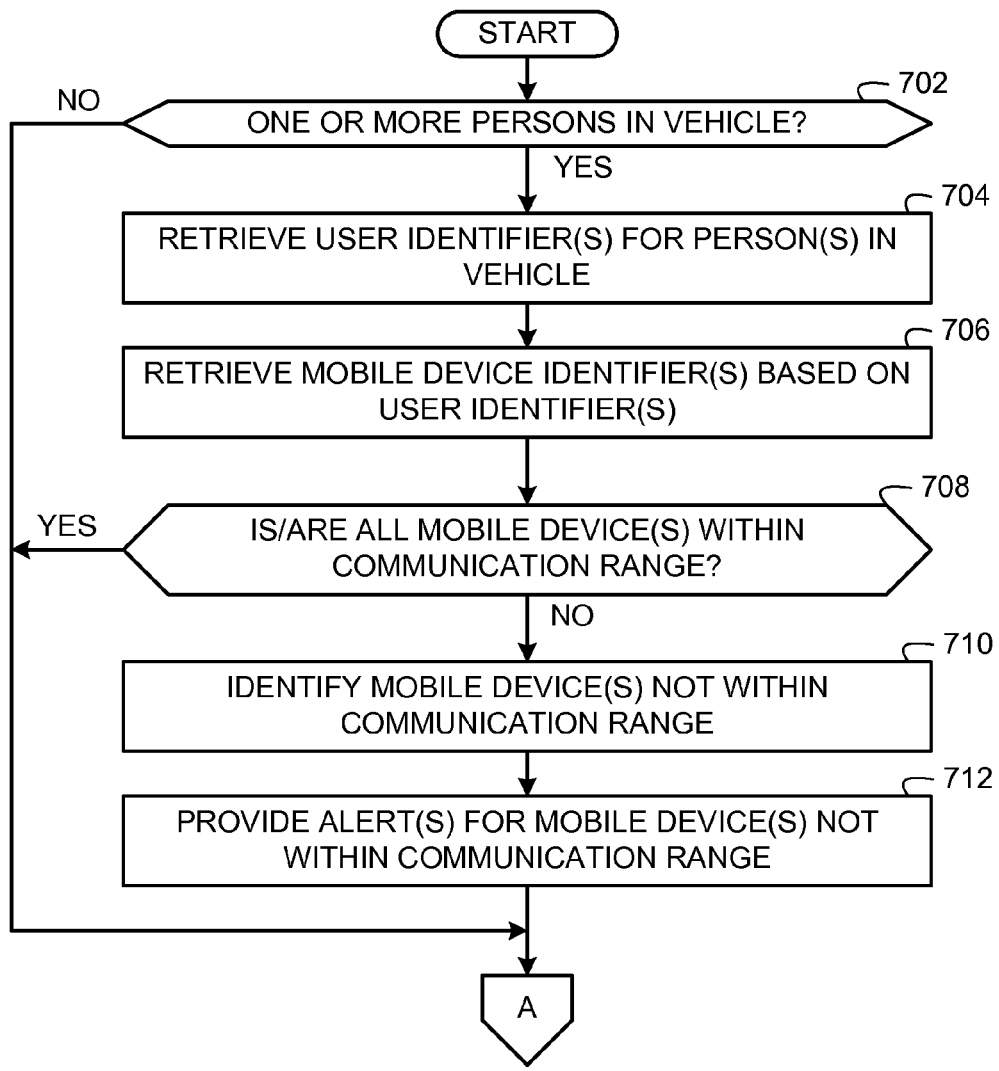
FIGS. 7A and 7B depict an example flow diagram representative of computer readable instructions that may be used to detect for the presence and/or absence of mobile devices and provide notifications of missing or forgotten mobile devices.
Figure 7B:
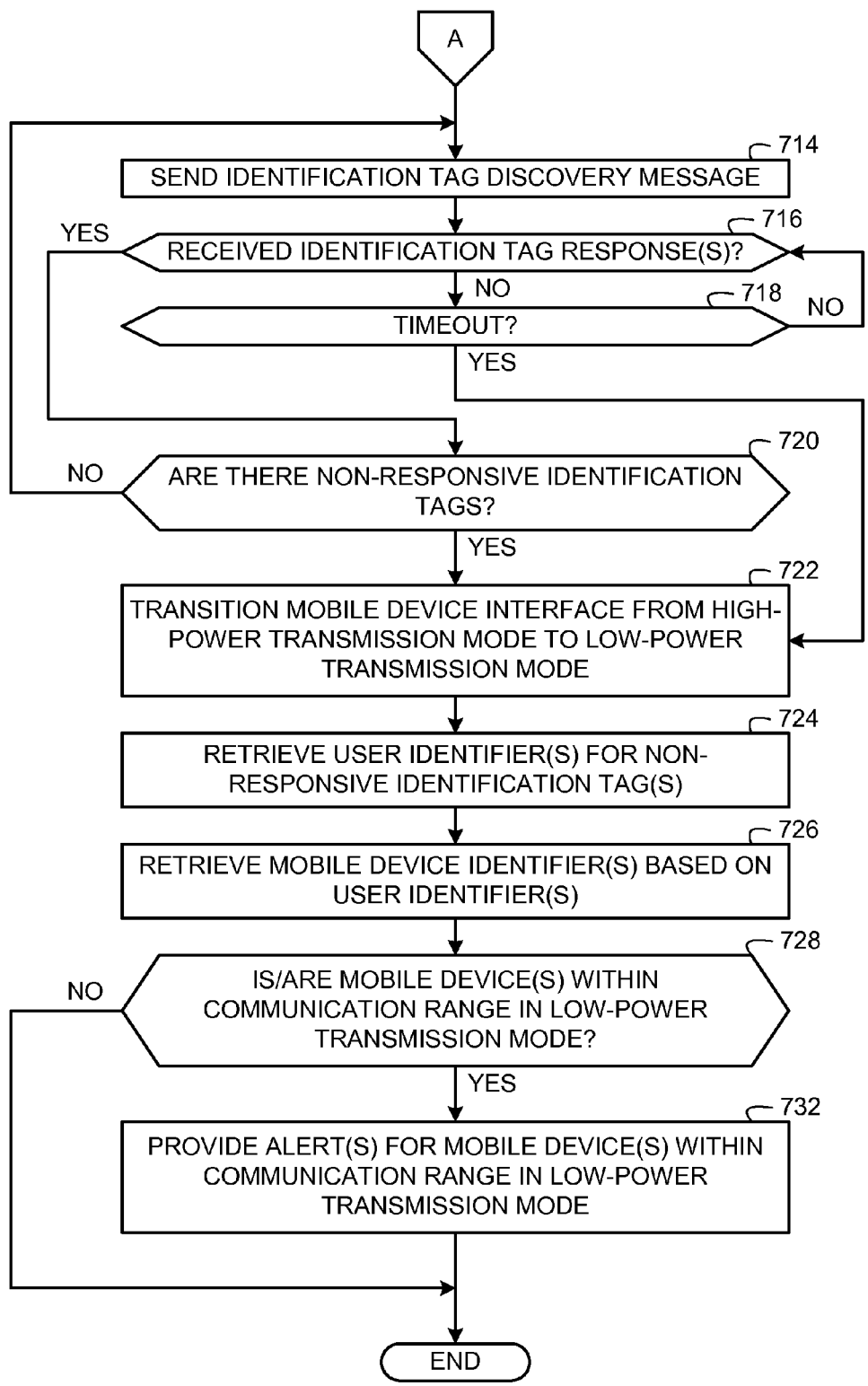

FIGS. 7A and 7B depict example flow diagrams representative of processes that may be implemented using, for example, computer readable instructions stored on a computer-readable medium to detect for the presence and/or absence of mobile devices and provide notifications of missing or forgotten mobile devices (e.g., the mobile device 108 of FIGS. 1-4 and 6). The example processes of FIGS. 7A and 7B may be performed using one or more processors, controllers, and/or any other suitable processing devices. For example, the example processes of FIGS. 7A and 7B may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIGS. 7A and 7B may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 7A and 7B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 7A and 7B may be implemented manually or as any combination(s) of any of the foregoing techniques, for example, any combination of firmware, software, discrete logic and/or hardware. Further, although the example processes of FIGS. 7A and 7B are described with reference to the flow diagrams of FIGS. 7A and 7B, other methods of implementing the processes of FIGS. 7A and 7B may be employed. For example, the order of execution of the blocks may be changed, and/or some of the blocks described may be changed, eliminated, sub-divided, or combined. Additionally, any or all of the example processes of FIGS. 7A and 7B may be performed sequentially and/or in parallel by, for example, separate processing threads, processors, devices, discrete logic, circuits, etc.

Now turning in detail to FIGS. 7A and 7B, example operations depicted in FIG. 7A are representative of an example process that may be used to detect for the absence of one or more mobile device(s) (e.g., the mobile device 108 of FIGS. 1-4 and 6) when the person(s) (e.g., the person 106 of FIGS. 1-4) associated with such mobile device(s) are located in a vehicle (e.g., the vehicle 104 of FIGS. 1-4), and example operations depicted in FIG. 7B are representative of an example process that may be used to detect for the presence of one or more mobile device(s) (e.g., the mobile device 108) located in the vehicle (e.g., the vehicle 104) when corresponding person(s) (e.g., the person 106) is/are not located in the vehicle (i.e., the person(s) is/are located outside the vehicle). The example processes of FIGS. 7A and 7B are described as being performed by the mobile device detector 102 of FIGS. 1-4 as implemented using the example apparatus 500. However, the example processes of FIGS. 7A and 7B may be implemented using apparatus having configurations or structures different from the apparatus 500. In addition, although the example operations of FIG. 7A are shown as passing control to the example operations of FIG. 7B, the example operations of FIG. 7A may alternatively be implemented as a process that is separate or independent from the example operations of FIG. 7B.

Now turning in detail to FIG. 7A, initially, the processor 502 (FIG. 5) determines whether there are one or more persons located in the vehicle 104 (block 702). For example, the occupant detector interface 506 may receive information from the occupant detector 114 of FIG. 1, the in-cabin camera 112 of FIG. 1, an ignition switch, and/or the identification tag wireless interface 514 indicative of one or more persons in the vehicle 104 and send the information to the processor 502. If there are one or more persons located in the vehicle 104, the user identifier interface 508 retrieves one or more user identifier(s) for the corresponding person(s) in the vehicle 104 (block 704). To perform the operation of block 704 in the illustrated example, the identification tag wireless interface 514 broadcasts or sends an interrogation request for reception by any identification tags (e.g., the identification tag 110 of FIGS. 1-4) in the vehicle 104 and receives one or more identification tag responses. The user identifier interface 508 then receives the one or more identification tag responses from the identification tag wireless interface 514 and retrieves or extracts a user identifier from each identification tag response. If the processor 502 (FIG. 5) determines that there are no persons located in the vehicle 104 (block 702), control advances to block 714 in FIG. 7B.

The mobile device identifier interface 512 retrieves one or more mobile device identifier(s) based on the user identifier(s) (block 706) retrieved at block 704. For example, the mobile device identifier interface 512 receives the user identifier(s) from the user identifier interface 508 and accesses the user profile data store 510 to retrieve respective mobile device identifier(s) stored in association with the user identifier(s) in the user profile data store 510. In the illustrated example, the device identifier(s) retrieved at block 706 identify the mobile device(s) that the mobile device detector 102 expects to detect as located in the vehicle 104 based on corresponding person(s) identified at block 704 having been detected as located in the vehicle 104.

The processor 502 determines whether all of the mobile device(s) identified at block 706 are within communication range of the mobile device detector 102 (or vehicle 104) (block 708). In the illustrated example, if the mobile device 108 is in communication range of the mobile device detector 102 (or vehicle 104), the processor 502 determines that the mobile device 108 is located in the vehicle 104. To perform the operation of block 708, the mobile device wireless interface 516 determines whether it has connections established with the mobile device(s) corresponding to the mobile device identifier(s) retrieved at block 706. In addition, the mobile device wireless interface 516 sends information (e.g., mobile device identifier(s)) to the processor 502 indicating which mobile device(s) is/are in communication range of the mobile device detector 102 (or vehicle 104). If the processor 502 determines that all of the mobile device(s) identified at block 706 are within communication range of the mobile device detector 102 (or vehicle 104), control advances to block 714 in FIG. 7B.

If the processor 502 determines at block 708 that not all of the mobile device(s) identified at block 706 are within communication range of the mobile device detector 102 (or vehicle 104), the processor 502 identifies or determines which of the mobile device(s) identified at block 706 are not within communication range of the mobile device detector 102 (or vehicle 104) (block 710). For example, the processor 502 may determine which mobile device(s) has/have wireless connections established with the mobile device wireless interface 516. The results from block 710 indicate which mobile device(s) is/are not located in the vehicle 104. The notifier 518 (FIG. 5) provides one or more alert(s) or notification(s) based on the mobile device(s) identified at block 710 as not within communication range of the mobile device detector 102 (or vehicle 104) (block 712). In the illustrated example, the notifier 518 determines that it should cause an alert (e.g., an audible alert) to be emitted in the cabin of the vehicle 104 such as the alert or notification 202 of FIG. 2 because the occupant(s) (e.g., the person 106 and any other detected person) are located in the vehicle 104.

After the notifier 518 provides one or more alert(s) at block 712, control advances to block 714 in FIG. 7B to detect when a person (e.g., the person 106) leaves the vehicle 104 and determine whether the person leaves a respective mobile device (e.g., the mobile device 108) in the vehicle 104.

Now turning to FIG. 7B, the identification tag wireless interface 514 sends an identification tag discovery message (block 714). In the illustrated example, the identification tag wireless interface 514 broadcasts an interrogation message requesting all identification tags (e.g., the identification tag 110 of FIGS. 1-4) in the vehicle 104 to respond with their respective identifiers.

The identification tag wireless interface 514 determines whether it has received one or more identification tag response(s) from the identification tag(s) (block 716). If the identification tag wireless interface 514 determines at block 716 that it has not received an identification tag response, the identification tag wireless interface 514 determines whether a wait timeout has expired (block 718). For example, the identification tag wireless interface 514 (or the processor 502) may start a timer upon sending the identification discovery message at block 714 that, upon expiration, indicates when the identification tag wireless interface 514 should stop waiting for an identification tag response. While the identification tag wireless interface 514 determines at block 718 that the timeout has not expired, the identification tag wireless interface 514 continues to check for a received identification tag response at block 716 until a response is received or until the timeout expires.

When the identification tag wireless interface 514 receives one or more identification tag response(s) (block 716), the processor 502 determines whether there is/are any non-responsive identification tag(s) (block 720). In the illustrated example, to perform the operation of block 720 the user identifier interface 508 retrieves user identifier(s) from the identification tag response(s) received at block 716 by the identification tag wireless interface 514 and sends the user identifier(s) to the processor 502. The processor 502 then compares the user identifier(s) to a list of the user identifier(s) obtained at block 704 representative of the occupants in the vehicle 104 to determine which persons were located in the vehicle 104 and have recently exited the vehicle 104. If there is not any non-responsive identification tag at block 720, control returns to block 714.

If there is at least one non-responsive identification tag, such as the identification tag 110, at block 720, or if the timeout is reached at block 718 without receiving any identification tag responses, control advances to block 722. The power mode arbiter 504 transitions the mobile device wireless interface 516 (FIG. 5) from a high-power transmission mode to a low-power transmission mode (block 722). Thus, at block 722, the power mode arbiter 504 reduces a communication range of the mobile device wireless interface 516. For example, the power mode arbiter 504 may reduce the wireless coverage of the mobile device wireless interface 516 from a communication range that extends to the distance D1 relative to the vehicle 104 (or the mobile device detector 102) as shown in FIG. 4 to a reduced communication range that extends to the distance D2 (or any other suitable distance shorter than the distance D1) relative to the vehicle 104 (or the mobile device detector 102) as shown in FIG. 4. At block 722, although not necessary, the power mode arbiter 504 may also cause the mobile device wireless interface 516 to send a request to all connected mobile devices to also transition to a low-power transmission mode.

The user identifier interface 508 retrieves the user identifier(s) for the non-responsive identification tag(s) (block 724). For example, the user identifier interface 508 may receive the user identifier(s) for the non-responsive identification tag(s) from the processor 502 based on a comparison performed by the processor 502 of the user identifier(s) received at block 716 and the list of user identifier(s) obtained at block 704 representative of the occupants in the vehicle 104 when the process of FIG. 7A was performed. The mobile device identifier interface 512 retrieves corresponding mobile device identifier(s) for the user identifier(s) obtained at block 724 (block 726). For example, the mobile device identifier interface 512 may access the user profile data store 510 to retrieve corresponding mobile device identifier(s) for respective user identifier(s). For example, at block 724, the user identifier interface 508 may retrieve the user identifier for the identification tag 110, and at block 726, the mobile device identifier interface 512 retrieves the mobile device identifier for the mobile device 108 if the person 106 (and, thus, the identification tag 110) are not located in the vehicle 104 as shown in FIG. 3.

The processor 502 determines whether any mobile device(s) identified at block 726 is/are within communication range of the mobile device detector 102 (or the vehicle 104) when the mobile device wireless interface 516 is in the low-power transmission mode (block 728). At block 728, any mobile device in communication range of the mobile device detector 102 (or the vehicle 104) while the mobile device wireless interface 516 is in the low-power transmission mode is regarded as being located in the vehicle 104. If none of the mobile device(s) is/are within communication range of the mobile device detector 102 (or the vehicle 104) in the low-power transmission mode, the example process of FIG. 7B ends.

If any mobile device(s) (e.g., the mobile device 108) identified at block 726 is/are within communication range of the mobile device detector 102 (or the vehicle 104) in the low-power transmission mode, the notifier 518 (FIG. 5) provides an alert or notification based on the mobile device(s) (e.g., the mobile device 108) identified at block 728 as being within communication range of the mobile device detector 102 (or vehicle 104) (block 732). In the illustrated example, the notifier 518 determines that it should cause an alert (e.g., an audible alert) to be emitted outside the vehicle 104 such as the alert or notification 302 of FIG. 2 because the occupant(s) (e.g., the person 106 or any other person) is/are not located in the vehicle 104. In this manner, the occupant(s) can hear or perceive the alert 302 beyond an area of the vehicle 104 (e.g., beyond the distance D2 of FIG. 4). After the notifier 518 provides the alert or notification at block 732, the example process of FIG. 7B ends.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus comprising:
    a processor; and
    a memory in communication with the processor having instructions stored thereon that, when executed, cause the processor to:
        determine whether a portable first wireless transceiver is in communication range of a vehicle, the portable first wireless transceiver configured to provide an identifier associated with a person; and
        based on the portable first wireless transceiver not being in the communication range, transition a second wireless transceiver in the vehicle from a first power transmission mode to a relatively lower power transmission mode, the second wireless transceiver configured to wirelessly connect with a mobile device associated with the person.

2. An apparatus as defined in claim 1, wherein the second wireless transceiver is of a second wireless technology type different from a first wireless technology type of the first wireless transceiver.

3. An apparatus as defined in claim 2, wherein the second wireless technology type is a Bluetooth® technology.

4. An apparatus as defined in claim 1, wherein the first wireless transceiver is embedded in at least one of a key for the vehicle or a key fob.

5. An apparatus comprising:
    a processor; and
    a memory in communication with the processor having instructions stored thereon that, when executed, cause the processor to:
        determine whether a portable first wireless transceiver is in communication range of a vehicle, the portable first wireless transceiver configured to provide an identifier associated with a person;
        based on the portable first wireless transceiver not being in the communication range, transition a second wireless transceiver in the vehicle from a first power transmission mode to a relatively lower power transmission mode, the second wireless transceiver configured to wirelessly connect with a mobile device associated with the person;
        determine whether the second wireless transceiver is in communication with the mobile device when the second wireless transceiver is in the relatively lower power transmission mode; and
        provide an alert when the mobile device is in communication with the second wireless transceiver while the second wireless transceiver is in the relatively lower power transmission mode.

6. An apparatus as defined in claim 5, wherein the alert is indicative that the mobile device is in the vehicle when the person is outside of the vehicle.

7. An apparatus comprising:
    a first interface to wirelessly connect with a mobile device, the first interface operable in a first power mode to connect with the mobile device when the mobile device is located within a first distance from the first interface, the first interface operable in a second power mode to communicate with the mobile device when the mobile device is located within a second distance from the first interface, the second distance shorter than the first distance;
    a second interface to receive a user identifier from an identification tag via a wireless transmission; and
    a processor to transition the first interface from the first power mode to the second power mode when the identification tag is not responsive to the second interface.

8. An apparatus as defined in claim 7, further comprising a notifier to cause emission of an audio alert when the mobile device is connected to the first interface while the first interface is operating in the second power mode.

9. An apparatus as defined in claim 8, wherein the audio alert is indicative that a person associated with the user identifier has left the mobile device in a vehicle when the person is outside of the vehicle.

10. An apparatus as defined in claim 8, wherein the audio alert is indicative that the mobile device is in a vehicle when the identification tag is outside of the vehicle.

11. An apparatus as defined in claim 8, wherein the notifier is at least one of a vehicle alarm or a vehicle horn.

12. An apparatus as defined in claim 7, wherein the identification tag is embedded in at least one of a key for a vehicle or a key fob.

13. An apparatus as defined in claim 7, wherein the first interface is a Bluetooth® interface.

14. An apparatus as defined in claim 7, wherein the second interface is a radio frequency identification (RFID) interface.

15. An apparatus as defined in claim 7, wherein the first interface, the second interface, and the processor are located in a vehicle.

16. An automobile comprising:
    a first interface to wirelessly connect a mobile device to the automobile, the first interface wirelessly connectable to the mobile device when the mobile device is located within a first distance relative to the automobile;
    a second interface to determine whether a person is located within a second distance relative to the automobile;
    a power mode arbiter to reduce a communication range of the first interface in response to the person not being located within the second distance relative to the automobile; and a processor to initiate an alert perceivable beyond the second distance relative to the automobile in response to the second interface determining that the person is not located within the second distance relative to the automobile and that the first interface is connected to the mobile device in the reduced communication range.

17. An automobile as defined in claim 16, wherein the power mode arbiter is to reduce the communication range of the first interface by reducing a transmission power of the first interface to enable wireless communication between the mobile device and the automobile when the mobile device is located within the reduced communication range relative to the automobile but not located beyond the reduced communication range relative to the automobile.

18. An automobile as defined in claim 16, wherein the first interface is a first wireless communication interface and the second interface is a second wireless communication interface separate from the first wireless communication interface.

19. An automobile as defined in claim 16, wherein the first interface is a Bluetooth® wireless interface to enable communication between the mobile device and the automobile and the second interface is a radio frequency identification (RFID) wireless interface to enable communication between the automobile and an identification tag carried by the person to determine whether the person is located within the second distance relative to the automobile.

* * * * *